A. M. O'QUINN.
FRUIT SIZER AND GRADER.
APPLICATION FILED SEPT. 24, 1918.
1,293,177.
Patented Feb. 4, 1919.
5 SHEETS—SHEET 2.
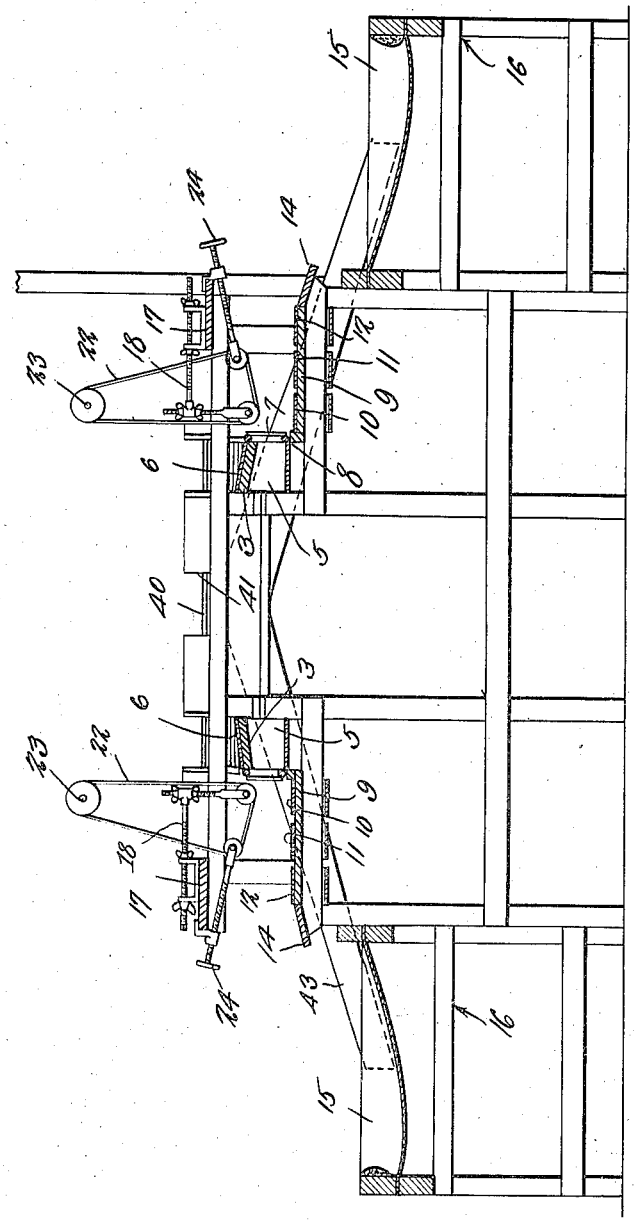
Witness
Inventor,
A. M. O'Quinn
By
Attorneys.

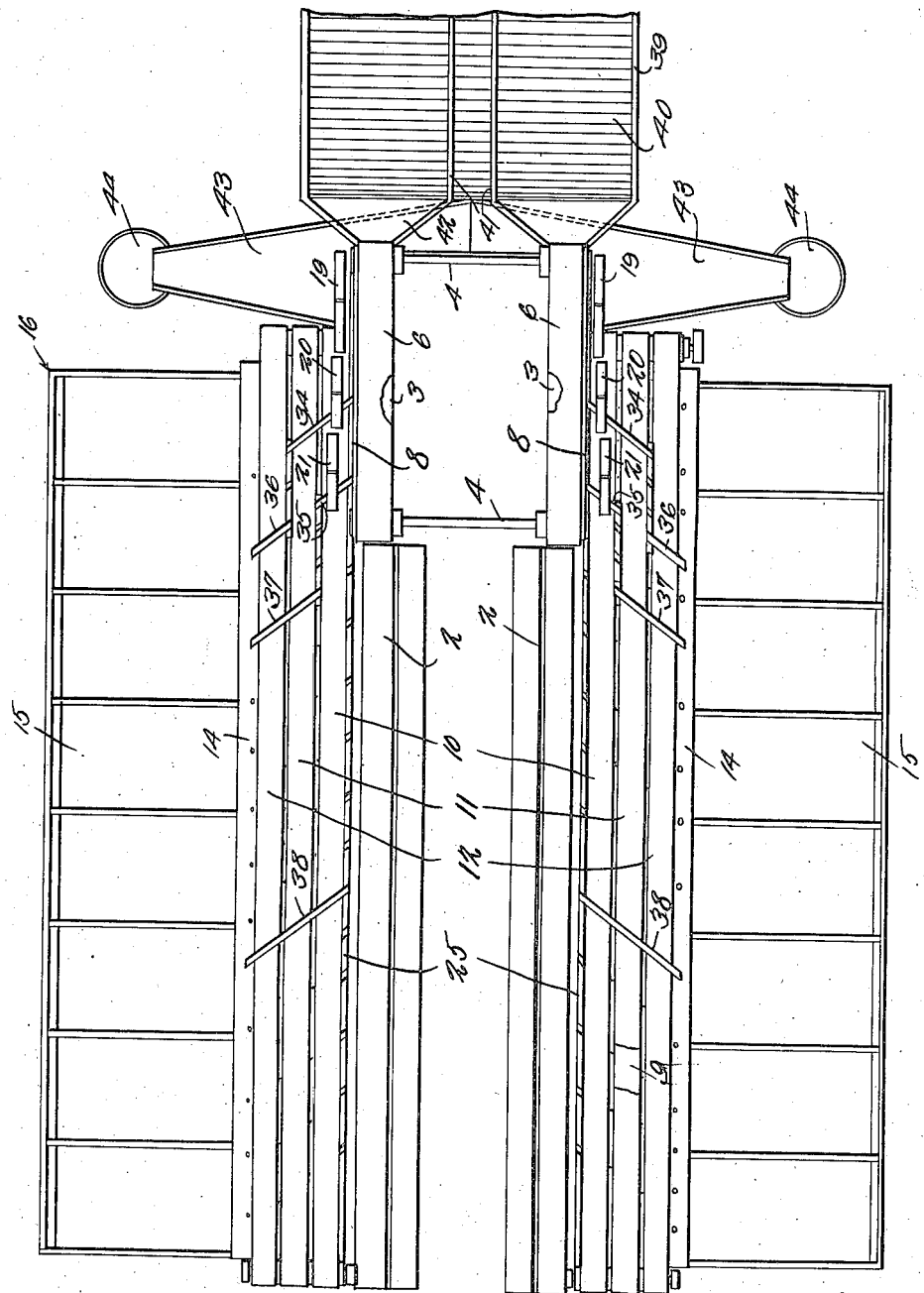

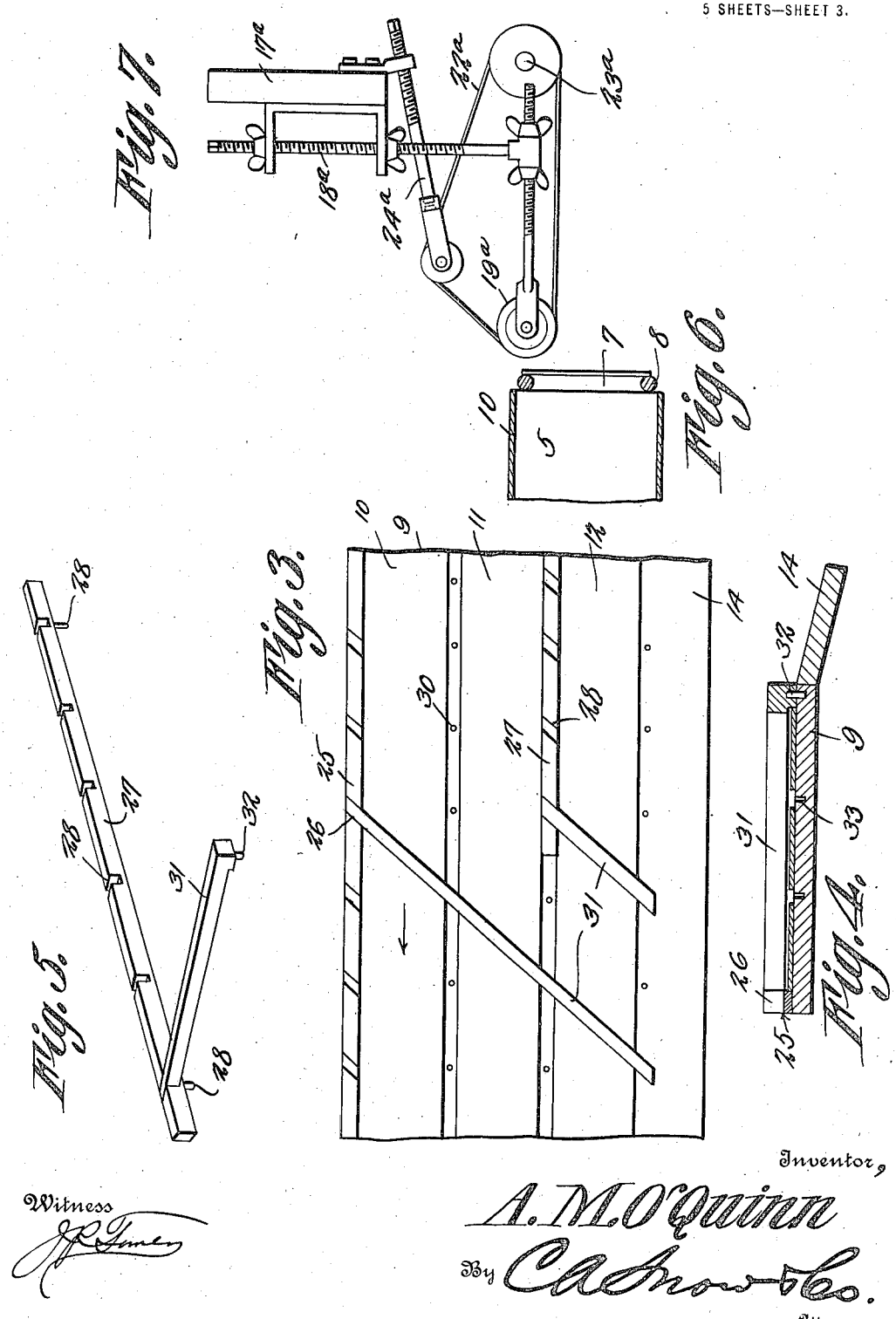

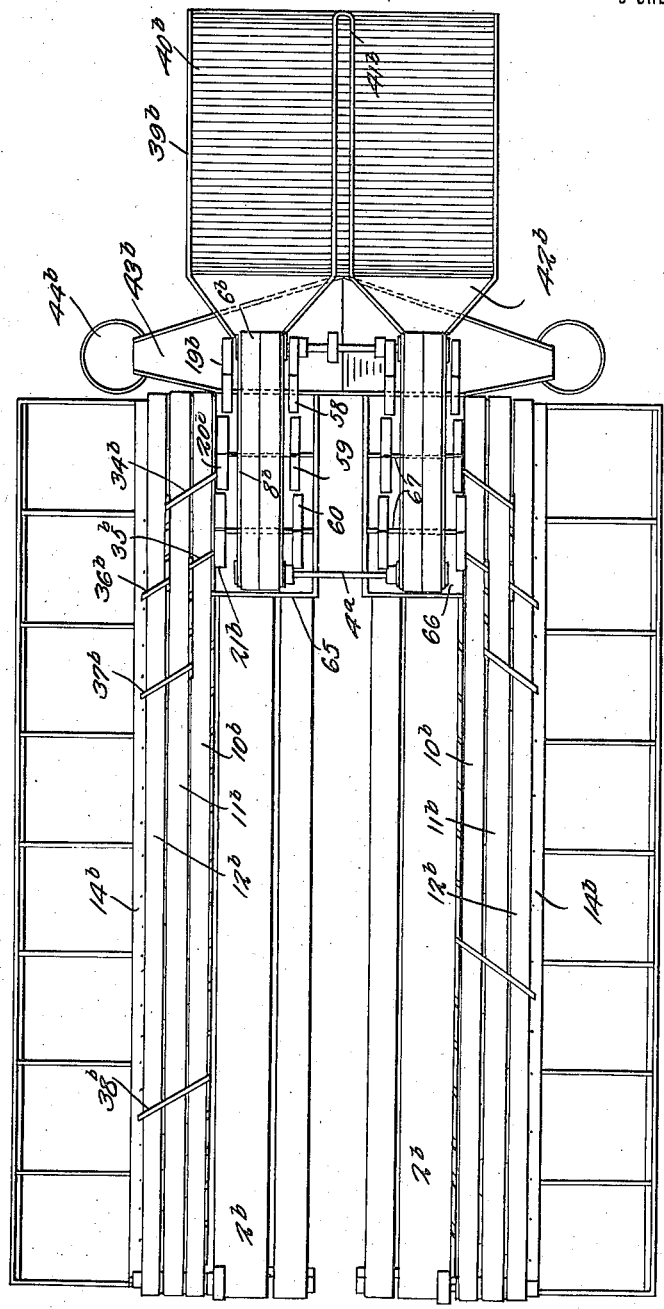

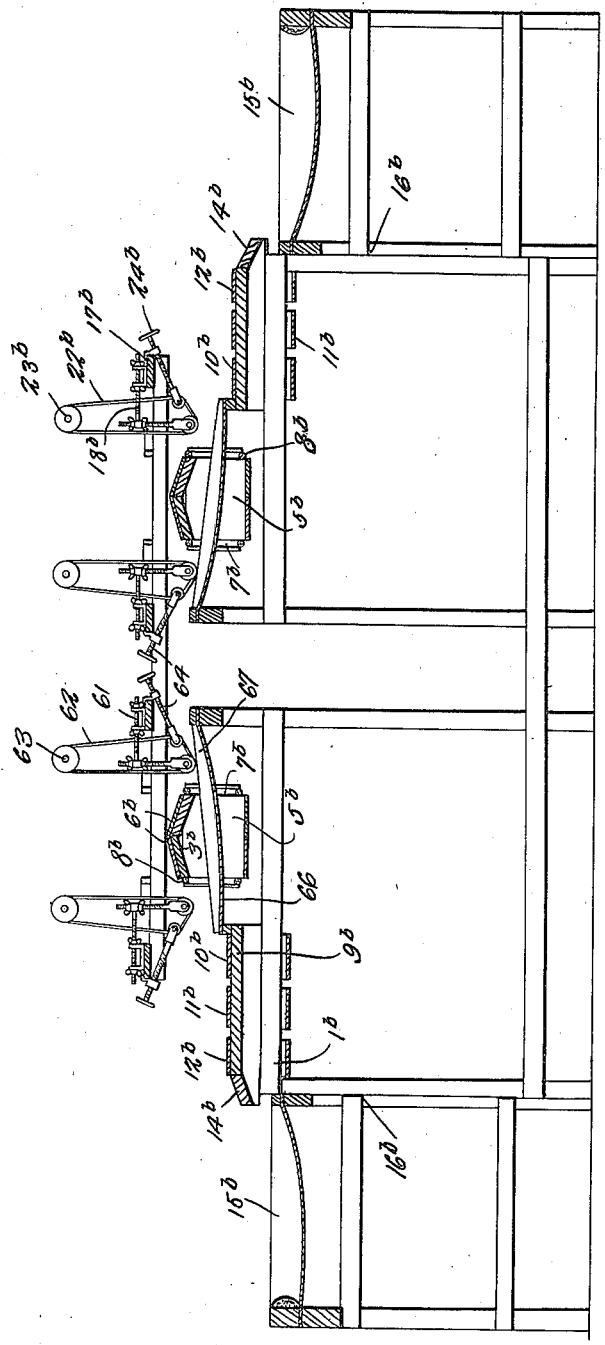

UNITED STATES PATENT OFFICE.

ARTHUR M. O'QUINN, OF FORT VALLEY, GEORGIA.

FRUIT SIZER AND GRADER.

1,293,177.

Specification of Letters Patent. Patented Feb. 4, 1919.

Application filed September 24, 1918. Serial No. 255,487.

*To all whom it may concern:*

Be it known that I, ARTHUR M. O'QUINN, a citizen of the United States, residing at Fort Valley, in the county of Houston and State of Georgia, have invented a new and useful Fruit Sizer and Grader, of which the following is a specification.

The device forming the subject matter of this application is adapted to be employed for sizing and grading fruit, vegetables and the like, and the invention aims to provide a machine of the kind above indicated, so constructed that it will occupy but little space, measured longitudinally, the structure being adapted to be used in packing houses wherein space is limited.

The invention aims to provide novel means for separating the fruit according to size and to provide novel means for receiving and caring for the fruit after it has been sized.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a sizing machine constructed in accordance with the invention, parts being broken away;

Fig. 2 is a transverse section through the complete machine;

Fig. 3 is a plan showing a portion of one of the tables;

Fig. 4 is a transverse section of the table;

Fig. 5 is a perspective view showing the mounting of the deflectors and attendant parts;

Fig. 6 is a sectional detail illustrating one of the pulleys;

Fig. 7 is an elevation showing a slight modification in the invention;

Fig. 8 is a plan showing another modification; and

Fig. 9 is a cross section of the structure shown in Fig. 8.

Referring to the device as delineated in Figs. 1 to 6, both inclusive, there is shown a main frame 1 which need not be described in detail, because it may be constructed in various ways, without jeopardizing the utility of the invention. The main frame 1 is provided adjacent its longitudinal center, with longitudinal foot ways 2, along which an inspector may walk to watch the working of the machine. The main frame 1 carries downwardly and outwardly sloping supports 3 located at one end of the foot ways 2 and lying within the contour of the frame work of the machine. Shafts 4 are journaled in the frame 1 at the ends of the sloping supports 3 and carry pulleys 5 around which are trained first belts 6 which slope downwardly and outwardly, to conform to the slope of the supports 3. The pulleys 5 at their outer ends are provided with grooved threads 7 carrying cable belts 8 located at the outer edges of the first belts 6. The cable belts not only travel longitudinally, but, as well, rotate upon their axes. This fact may be passed over briefly, because the structure out of which it arises, is shown, described and claimed in my copending application Serial No. 255,485, filed on the 24th day of September, 1918, and setting forth divers improvements in a sizer and grader.

Horizontal tables 9 are located outwardly of the sloping supports 3 and are disposed at a lower level than the supports, the tables 9 extending practically the entire length of the main frame 1. The tables 9 are traversed by second belts 10 located near to the outer ends of the pulleys 5. Third belts 11 move longitudinally of the tables 9 and are located outwardly of the belts 10. Fourth belts 12 traverse the tables 9 and are located outwardly of the third belts 11. At their outer edges, the tables 9 merge into downwardly inclined lips 14 discharging into the compartments 15 of packing benches 16 extended along the opposite sides of the main frame 1.

The main frame 1 includes horizontal plates 17 carrying adjusting devices 18 supporting grading rollers 19, 20 and 21, disposed end to end, the devices 18 being so constructed that the grading rollers may be adjusted vertically or horizontally. The grading rollers 19, 20 and 21 operate above the second belts 10, and extend longitudinally of the grading rollers 19, 20 and 21. The grading rollers 19, 20 and 21 together with the upper runs of the belts 6 form fruit runways, and the belts 8 aid in advancing the fruit and in rotating the fruit on its axis in a way set forth in my copending application above alluded to. The adjusting devices 18 are shown, described and claimed in another co-pending application Serial No. 255,486, filed on September 24, 1918, and setting forth sundry improvements in a sizer and grader. The grading rollers 19, 20 and 21 are driven by belts 22 from line shafts 23, shown in Fig. 2 as being disposed above the framework of the machine, the plates 17 carrying tightening devices 24, coöperating with the belts.

The particular construction last above set forth need not be adhered to strictly. Thus, in Fig. 7, wherein parts previously alluded to are designated by numerals hereinbefore used, with the suffix "a," the plate 17ª is shown as standing vertically, the tightening device 24ª and the adjusting device 18ª being arranged accordingly, and the line shaft 23ª being disposed at a lower elevation than is the line shaft 23 in Fig. 2.

The inner edges of the tables 9 are provided with fixed ribs 25 having seats or notches 26. Removable ribs 27 formed in sections extend longitudinally of the tables 9, between the belts 10, 11 and 12, and are provided with notches or seats 28, the removable ribs 27 having pins 29 adapted to be received in openings 30 in the table 9 for the purpose of holding the ribs in place. Inclined deflectors 31 are provided, each deflector being mounted in the notches 28 of the ribs 27, or in the notches 26 of the fixed ribs 25, depending upon where the deflectors are located, each deflector being provided at one end, with a pin 32, adapted to be received in a recess 33 in the table 9. The belts 10, 11 and 12, pass beneath the deflectors 31, the ribs 27 being located wherever desired, to coöperate with the deflectors 31 and to prevent the fruit from passing from one of the belts 10—11—12 to the other, at places where it is not desired that the fruit shall pass transversely from belt to belt.

The numeral 31 has been used above, to designate the deflectors generally in explaining their construction and method of mounting. In setting forth the operation of the machine, each deflector will be given an appropriate reference character, since the functions of the various deflectors are involved in the operation of the machine. Thus, a deflector 34 extends across the belts 10 and 11 adjacent the sizing roller 20, a deflector 35 extending across the belt 10 adjacent the sizing roller 21. A deflector 36 extends across the belt 12 and is disposed approximately opposite to the deflector 35 in Fig. 1. A deflector 37 extends across the belts 11 and 12, to the rear of the deflector 36. At some distance to the rear of the deflector 37, a deflector 38 extends across the belts 10, 11 and 12.

At one end of the main frame 1, there is located an auxiliary frame 39, traversed by a belt conveyer 40 above which is located a fixed receiver 41, the receiver being open at the bottom, so that material may be advanced along the receiver, by the belt conveyer. Longitudinal chutes 42 receive the material from the belt conveyer 40 on each side of the receiver 41, and discharge on the first belts 6. Oppositely inclined chutes 43 extend beneath the chutes 42, and discharge laterally into receptacles 44, the material advanced along the receiver 41 by the belt conveyer 40 being discharged upon the transverse chutes 43, adjacent the longitudinal center of the machine.

In practical operation, workmen stand on each side of the auxiliary frame 39 and pick out the ripe peaches, assuming that the structure is to be used for grading peaches, as the peaches travel upwardly on the belt conveyer 40, on each side of the receiver 41. The culls are picked out by the workmen, and are placed in the receiver 41, the belt conveyer 40 carrying the peaches in the receiver 41 upwardly and discharging them into the transverse chutes 43, from which the peaches will be discharged laterally into the receptacles 44.

The peaches on the belt conveyer 40, one each side of the receiver 41, are carried upwardly, and traverse the longitudinal chutes 42, the peaches being discharged on the first belts 6. Peaches of the smallest size pass between the sizing rolls 19 and the corresponding cable belts 8 and move downwardly into the transverse chutes 43, from which the said peaches are discharged into the receptacles 44. The next size of peaches is segregated by the sizing rollers 20 and the cable belts 8, the transverse inclination of the belts 6 serving to discharge the peaches laterally and outwardly, against the grading rollers. The peaches under consideration are received by the belts 10 and pass upon the belts 11, being received by the deflectors 34. Thence the peaches pass upon the belts 12 and are directed by the deflectors 36 into the appropriate compartments 15 of the packing benches 16.

The next size peaches passes downwardly between the grading rollers 21 and the cable belts 8 upon the belts 10, the peaches being directed by the deflectors 35 upon the belts 11 which carry the peaches against the deflectors 37, the peaches moving across the belts 12, and passing into the proper compartments 15 of the packing benches 16.

The peaches which are large enough to pass all of the sizing rollers 19, 20 and 21, are carried along by the belts 10, until the deflectors 38 are encountered, whereupon the peaches are discharged into the proper compartments 15, the fruit in all instances, of course, traversing the inclined lips 14 before entering the various compartments 15.

In Figs. 8 and 9 a modified form of the invention is shown. Much disclosed in these figures is common to that form of the structure shown in Figs. 1 and 2 and parts hereinbefore alluded to have been designated by numerals previously used, with the suffix "b."

Additional grading rollers 58 and 59 and 60 are located between the first belts $6^b$, these grading rollers being controlled by adjusting devices 61, as before, and being driven by belts 62 from line shafts 63, the tightening devices for the belts being denoted by the numeral 64. The supports $3^b$ slope in opposite directions, and the belts $6^b$ slope accordingly. The pulleys $5^b$ have grooved treads $7^b$ at both ends receiving cable belts $8^b$.

The fruit received on the belts $6^b$ is discharged in opposite directions, to coöperate with the outer grading or sizing rollers $19^b$, $20^b$ and $21^b$, and to coöperate with the inner sizing rollers 58, 59 and 60 together with the corresponding cable belts $8^b$. The fruit discharged inwardly and outwardly from the rollers $20^b$, $21^b$, 59, and 60 is received within a casing 65, having a downwardly and outwardly sloping bottom 66, the casing being separated into compartments, by partitions 67. The fruit is discharged laterally, from the casings 65, across the belts $10^b$, $11^b$ and $12^b$, in the way hereinbefore set forth. The small fruit from the sizing rollers 58 passes into the lateral chutes $43^b$ as described above.

In the form shown in Figs. 8 and 9, the capacity of the sizing mechanism is doubled, the length of the distributing and receiving means being increased as desired without increasing the width of the machine.

Having thus described the invention, what is claimed is:—

1. In a device of the class described, a frame having a centrally disposed sizing means within its contour, at one end; distributing means extended along the outer sides of the frame and along the outer sides of the sizing means; and mechanism at said end of the frame for delivering the material to the sizing means.

2. In a device of the class described, a frame having a centrally disposed sizing means within its contour, at one end; distributing means extended along the outer sides of the frame and along the outer sides of the sizing means; mechanism at said end of the frame for delivering the material to the sizing means; and a footway within the contour of the frame, between the distributing means, and at the inner end of the sizing means.

3. In a device of the class described, a distributing means; a lateral delivery member; a sizing means discharging partly on the distributing means and partly on the delivery member; and a source of supply discharging partly on the sizing means and partly on the delivery member.

4. In a device of the class described, a distributing means; a lateral delivery member; sizing mechanism comprising a belt conveyer, and sizing rolls one of which discharges on the delivery member, another of which discharges on the distributing means; and a source of supply discharging partly on the belt conveyer and partly on the delivery member.

5. In a device of the class described, a distributing means; a lateral delivery member; a sizing mechanism comprising a belt conveyer, and sizing rolls one of which discharges on the delivery member, another of which discharges on the distributing means; and a second belt conveyer one portion of which discharges on the belt conveyer of the sizing mechanism, another portion of which discharges on the delivery member.

6. In a device of the class described, separate distributing means; oppositely extended delivery members; separate sizing means coöperating with the respective distributing means and discharging partly into the respective delivery members; and a source of supply discharging partly on the respective sizing means and partly on the respective delivery members.

7. In a device of the class described, separate distributing means; oppositely inclined transverse chutes; separate sizing means coöperating with the respective distributing means, and discharging, respectively, into the chutes; a belt conveyer; chutes leading from the belt conveyer to the sizing means; and a receiver for which the belt conveyer forms a bottom, the receiver discharging into the delivery members.

8. In a device of the class described, sizing means comprising belt conveyers and sizing rollers coöperating therewith; distributing means whereinto certain of the rollers discharge; lateral chutes whereinto others of the rollers discharge; and a source of supply comprising parts which coöperate with the belt conveyers, and a part which coöperates with the chutes.

9. In a device of the class described, a pair of oppositely extended downwardly inclined chutes; a receiver discharging upon the chutes adjacent to their apex; separate sizing means discharging into the respective chutes, in part; distributing means whereinto the respective sizing means discharge; a conveyer forming a bottom for the receiver; and chutes leading from the conveyer to the respective sizing means.

10. In a device of the class described, sizing means including first belt conveyers and sizing rollers extended longitudinally of the belt conveyers; oppositely extended chutes at the forward end of the sizing means, and receiving the material from certain of the rollers; distributing means at the rear of the troughs and receiving the material from others of the rollers; a second belt conveyer; chutes leading from the second belt conveyer to the belt conveyers of the sizing means; and a receiver for which the second belt conveyer forms a bottom; the receiver discharging into the first specified chutes.

11. In a device of the class described, a table; belts movable over the table; ribs between the belts; means for connecting the ribs removably with the table at adjusted points longitudinally of the table; and removable deflectors detachably interengaged with the ribs and with the table, the deflectors coacting with the belts.

12. In a device of the class described, sizing means including transversely spaced rollers and belt conveyers movable longitudinally of the rollers and inclined downwardly toward the rollers; distributing mechanisms individual to the sizing means; oppositely extended chutes extended beneath the sizing means and discharging on the distributing mechanisms; and a delivery device discharging on the sizing means, the delivery device including a receiver for the segregated material, having an outlet independent of the distributing mechanisms.

13. In a device of the class described, sizing means located side by side; distributing mechanisms individual to the sizing means; and oppositely inclined chutes extended beneath the sizing means and discharging on the respective distributing mechanisms.

14. In a device of the class described, a fixed member having oppositely sloping parts; a belt conveyer movable longitudinally of said parts and inclined to correspond to the slope thereof; cable conveyers movable along the longitudinal edges of said parts; grading rollers coöperating with the belt and cable conveyers; a distributing means disposed at one side of the fixed member; and an inclined chute extended beneath the conveyers and the rollers and discharging on the distributing means.

15. In a device of the class described, spaced distributing means; fixed members between the distributing means and each comprising oppositely slanting parts; first grading rollers between the fixed members; second grading rollers disposed outwardly of the fixed members; belt conveyers traversing the fixed members and each comprising oppositely slanting portions coöperating respectively with the first and second grading rollers; oppositely slanting chutes located beneath the fixed members and beneath the corresponding first and second grading rollers and discharging on the respective distributing means; and a source of supply discharging on the belt conveyers, the source of supply including a receiver for segregated material, having an outlet, certain of the rollers discharging into the outlet.

In testimony that I claim the foregoing as my own I have hereto affixed my signature in the presence of two witnesses.

ARTHUR M. O'QUINN.

Witnesses:
  MASON B. LAWTON,
  IVY E. SIMPSON.